(12) United States Patent
Vasseur et al.

(10) Patent No.: US 10,148,537 B2
(45) Date of Patent: Dec. 4, 2018

(54) DETECTING OSCILLATION ANOMALIES IN A MESH NETWORK USING MACHINE LEARNING

(71) Applicant: Cisco Technology, Inc., San Jose, CA (US)

(72) Inventors: Jean-Philippe Vasseur, Saint Martin d'uriage (FR); Pascal Thubert, La Colle sur Loup (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 331 days.

(21) Appl. No.: 14/855,492

(22) Filed: Sep. 16, 2015

(65) Prior Publication Data
US 2017/0078170 A1 Mar. 16, 2017

(51) Int. Cl.
H04L 12/26 (2006.01)
H04L 29/06 (2006.01)
G06N 99/00 (2010.01)

(52) U.S. Cl.
CPC ........... *H04L 43/08* (2013.01); *G06N 99/005* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,424,619 B1 * | 9/2008 | Fan ...................... | G06F 21/552 713/188 |
| 7,458,098 B2 * | 11/2008 | Judge .................. | H04L 63/1416 713/151 |
| 7,792,770 B1 * | 9/2010 | Phoha .................. | G06K 9/6284 706/45 |
| 8,381,299 B2 * | 2/2013 | Stolfo .................. | G06F 21/564 726/24 |
| 8,462,650 B2 | 6/2013 | Qiang et al. | |
| 2002/0032717 A1 * | 3/2002 | Malan ..................... | H04L 41/12 718/105 |
| 2008/0163333 A1 * | 7/2008 | Kasralikar .......... | H04L 63/1408 726/1 |

(Continued)

OTHER PUBLICATIONS

Thubert et al., "An Architecture for IPv6 over the TSCH Mode of IEEE 802.15.4e", Internet Draft, draft-ietf-6tisch-architecture-05, Jan. 27, 2015, 40 pages, IETF Trust.

(Continued)

*Primary Examiner* — Donald L Mills
(74) *Attorney, Agent, or Firm* — Parker Ibrahim & Berg LLP; James M. Behmke; Stephen D. LeBarron

(57) ABSTRACT

In one embodiment, a device in a network receives metrics regarding a node in the network. The device uses the metrics as input to a machine learning model. The device determines, using the machine learning model and based on the metrics, an indication of abnormality of the node oscillating between using a plurality of different routing parents in the network. The device provides a results notification based on the indication of abnormality of the node oscillating between using the plurality of different routing parents.

18 Claims, 17 Drawing Sheets

(56) References Cited

U.S. PATENT DOCUMENTS

| | | | |
|---|---|---|---|
| 2009/0135738 A1* | 5/2009 | Mhatre | .................. H04L 45/02 370/256 |
| 2010/0284282 A1* | 11/2010 | Golic | .................... H04L 43/022 370/242 |
| 2010/0284288 A1* | 11/2010 | Lee | ..................... H04L 63/1416 370/252 |
| 2014/0222729 A1 | 8/2014 | Dasgupta et al. | |
| 2014/0222998 A1 | 8/2014 | Vasseur et al. | |
| 2014/0281670 A1 | 9/2014 | Vasseur et al. | |
| 2015/0193696 A1 | 7/2015 | Vasseur et al. | |

OTHER PUBLICATIONS

Winter et al., "RPL: IPv6 Routing Protocol for Low-Power and Lossy Networks", Request for Comments 6550, Mar. 2012, 157 pages, Internet Engineering Task Force Trust.

Gnawali et al., "The Minimum Rank with Hysteresis Objective Function", Request for Comments 6719, Sep. 2012, 13 pages, Internet Engineering Task Force Trust.

Thubert P., "Objective Function Zero for the Routing Protocol for Low-Power and Lossy Networks (RPL)", Request for Comments 6552, Mar. 2012, 14 pages, Internet Engineering Task Force Trust.

Vasseur et al., "Routing Metrics Used for Path Calculation in Low-Power and Lossy Networks", Request for Comments 6551, Mar. 2012, 30 pages, Internet Engineering Task Force Trust.

\* cited by examiner

DETECTING OSCILLATION ANOMALIES IN A MESH NETWORK USING MACHINE LEARNING

TECHNICAL FIELD

The present disclosure relates generally to computer networks, and, more particularly, to detecting oscillation anomalies in a mesh network using machine learning.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives metrics regarding a node in the network. The device uses the metrics as input to a machine learning model. The device determines, using the machine learning model and based on the metrics, an indication of abnormality of the node oscillating between using a plurality of different routing parents in the network. The device provides a results notification based on the indication of abnormality of the node oscillating between using the plurality of different routing parents.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
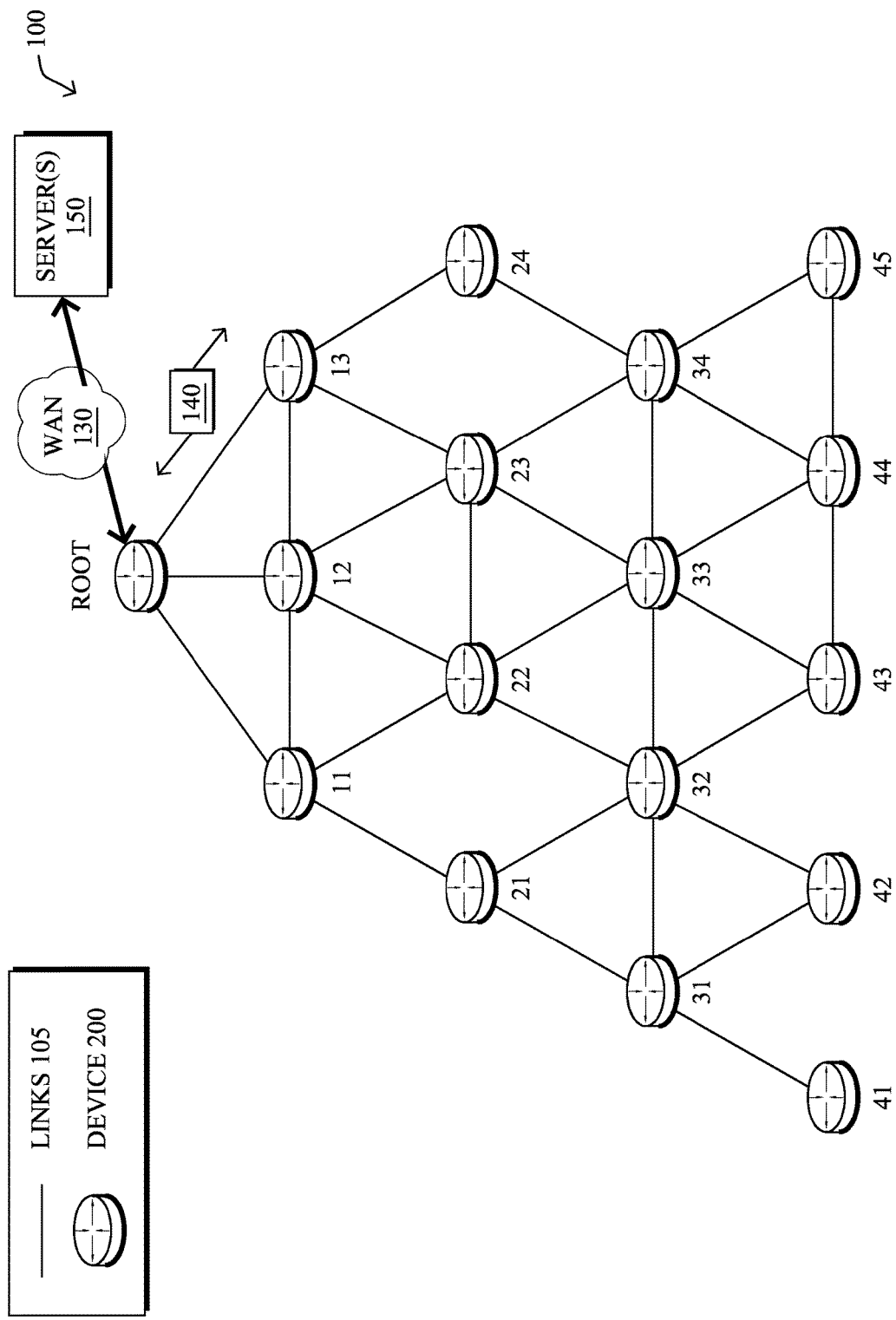
FIG. 1 illustrates an example communication network.

FIG. 1 is a schematic block diagram of an example computer network 100 illustratively comprising nodes/devices 200 (e.g., labeled as shown, "Root," "11," "12," ... "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
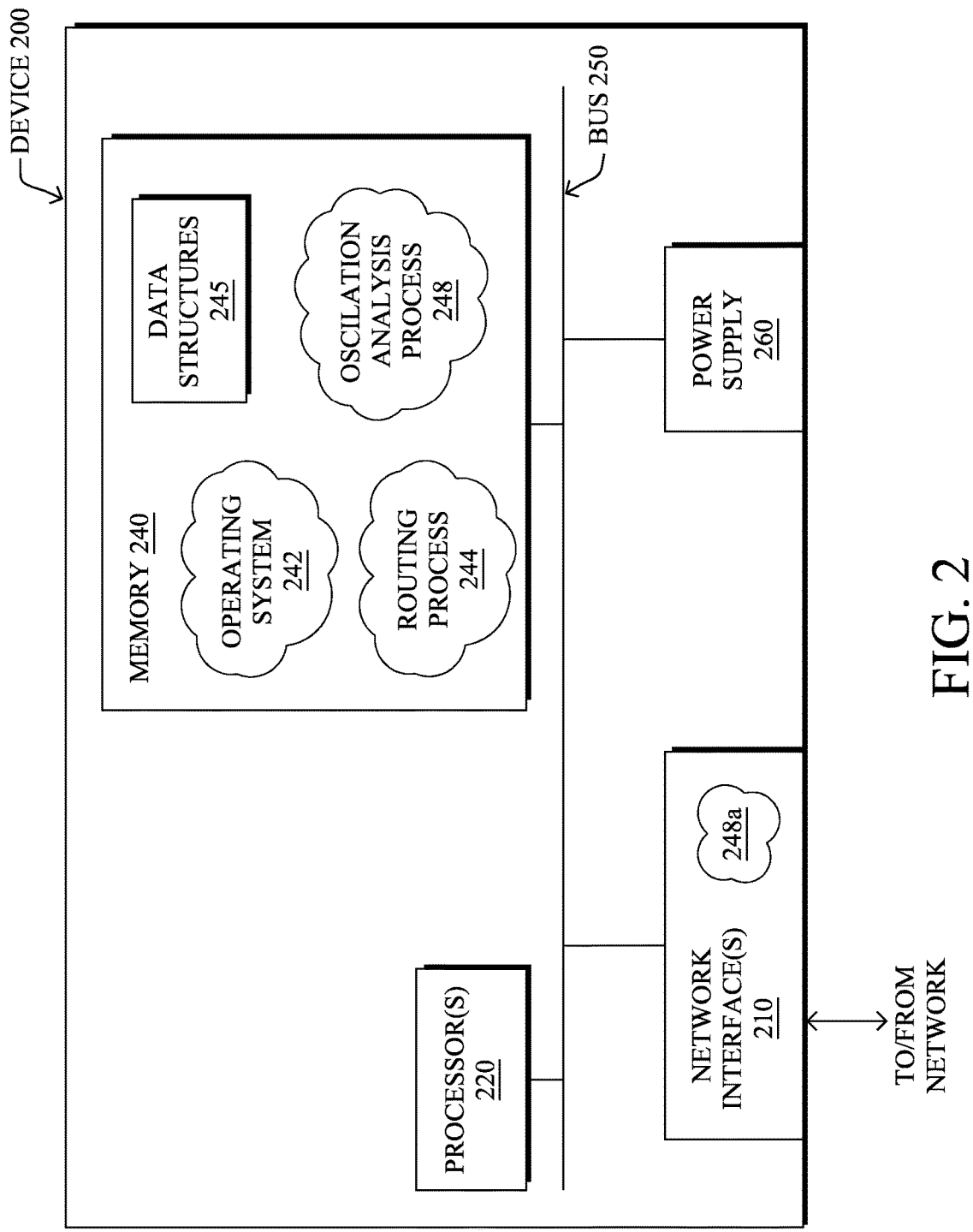
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative oscillation analysis process 248, as described herein. Note that while oscillation analysis process 248 is shown in centralized memory 240, alternative embodiments provide for at least a portion of process 248 to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

According to various embodiments, portions of oscillation analysis process 248 may use machine learning, to detect or otherwise analyze oscillation anomalies in the network. Generally, machine learning is concerned with the design and the development of algorithms that take empirical data as input and recognize complex patterns in these data. These patterns may then be used to make decisions automatically (e.g., via close-loop control, etc.) and/or to help make decisions.

Machine learning is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The machine learning process then entails adjusting the parameters a,b,c such that the number of misclassified points is minimal. After this optimization phase (or learning phase), the model M can be used very easily to classify new data points. Often, the model M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may make future predictions dynamically based on current and/or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) artificial neural networks (ANNs) (e.g., for non-linear models), and replicating reservoir networks (e.g., for non-linear models, typically for time series).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Specifically in the context of industrial networking, additional constrains may be placed on an LLN. Notably, in many industrial applications, determinism may be required. In other words, a design constraint on an industrial network may be a guarantee that packets will be delivered within a bounded time. This translates into the following characteristics, in many implementations:

High delivery ratio (loss rate of 10-5 to 10-9 depending on the application)

Fixed latency

Jitter close to zero (micro seconds)

A limited degree of control can be achieved with Quality of Service (QoS) tagging and shaping/admission control. For time sensitive flows, though, latency and jitter can only be fully controlled with the effective scheduling of every transmission at every hop. In turn, the delivery ratio may be optimized by applying packet redundancy with all possible forms of diversity, in space, time, frequency, code, hardware (e.g., links and routers), and/or software implementations.

Most of the methods above apply to both Ethernet and wireless technologies. Mixed approaches combine QoS technologies with scheduling (emission of packets on the different QoS queues is triggered by a schedule based gate mechanism), which is known as being the only solution effectively providing hard guarantees since over capacity provisioning can only help in some ways, without avoiding queuing in presence of a burst of traffic that would unavoidably lead to delays. Deterministic Ethernet or Deterministic Wireless based on time-scheduled mechanisms require that all the nodes being part of the path to be time synchronized. The Network Time Protocol (NTP) and Precision Time Protocol (PTP) are examples of technologies used to ensure time distribution among all the nodes. Precision needs to go to microseconds for Ethernet based communications, in many implementations.

The forwarding of each packet is then regulated by a time schedule that specifies when this specific packet has to be transmitted to the wire or the radio and this for each node on the path. This specific time period is called a time slot. An external agent (called the orchestrator) usually performs the computation of this path and the associated timetable. Such a model is similar to a Path Computation Engine (PCE), which was invented for Multiprotocol Label Switching (MPLS) networks, to compute a Traffic Engineering Label Switch Path, with the major difference being that that a time schedule is provided instead of simply a constrained shortest path. In this example, the path is both the path between physical nodes and the timetable associated with each traffic flow. When the computation is done, the path and the timetable are then downloaded on every node participating the traffic forwarding, which in turn start receive and transmit packets according to the computed time schedule.

An example architecture to support such a technique may be found in the IETF draft entitled "An Architecture for IPv6 over the TSCH mode of IEEE 802.15.4e" by Thubert et al. (February 2014), which is referred to herein as "6TiSCH". The centralized computation is typically done by an orchestrator/PCE (e.g., PCE 102) with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

An example routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, is and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
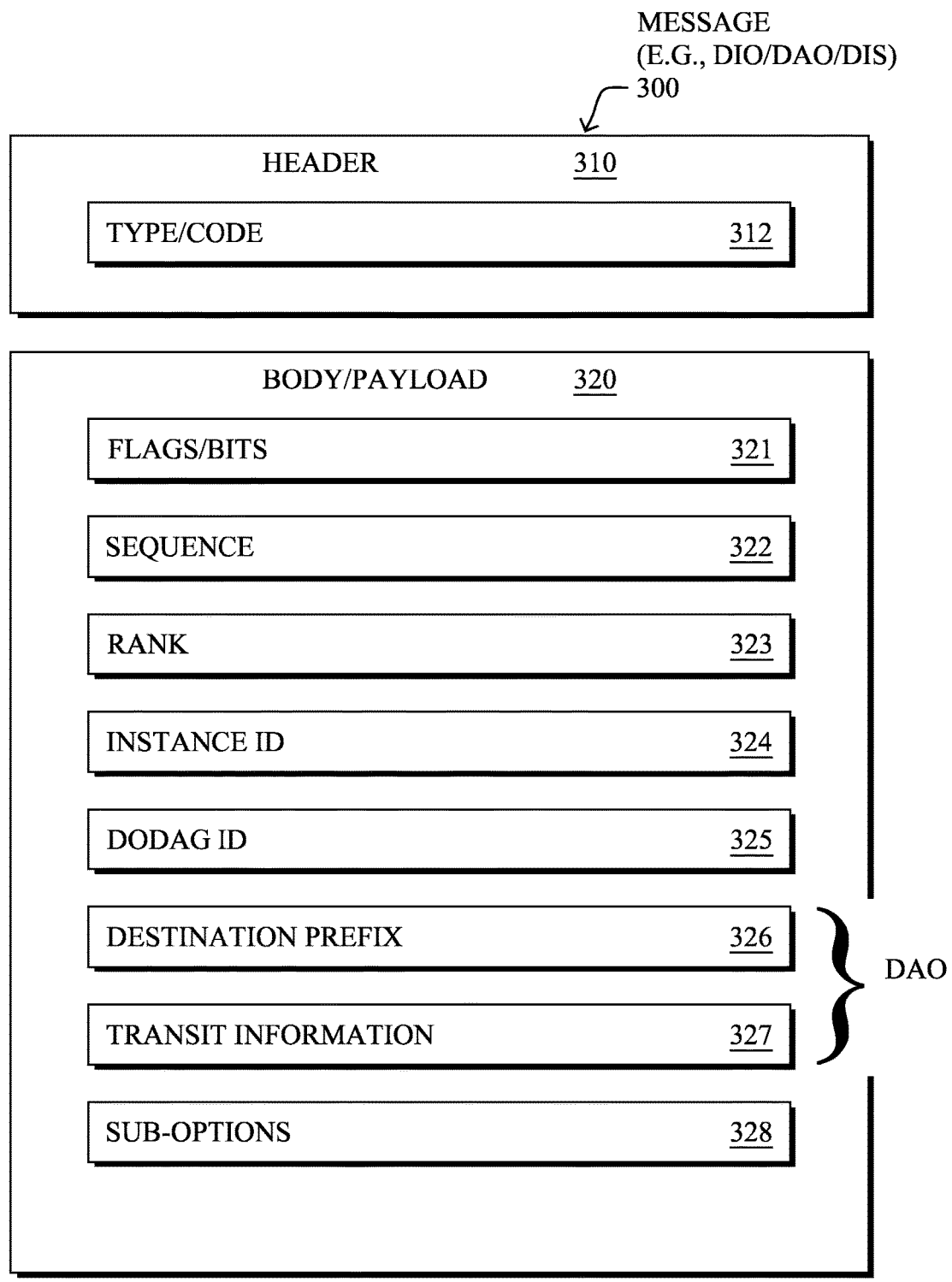
FIG. 3 illustrates an example simplified control message format that may be used for discovery and route dissemination.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4A:
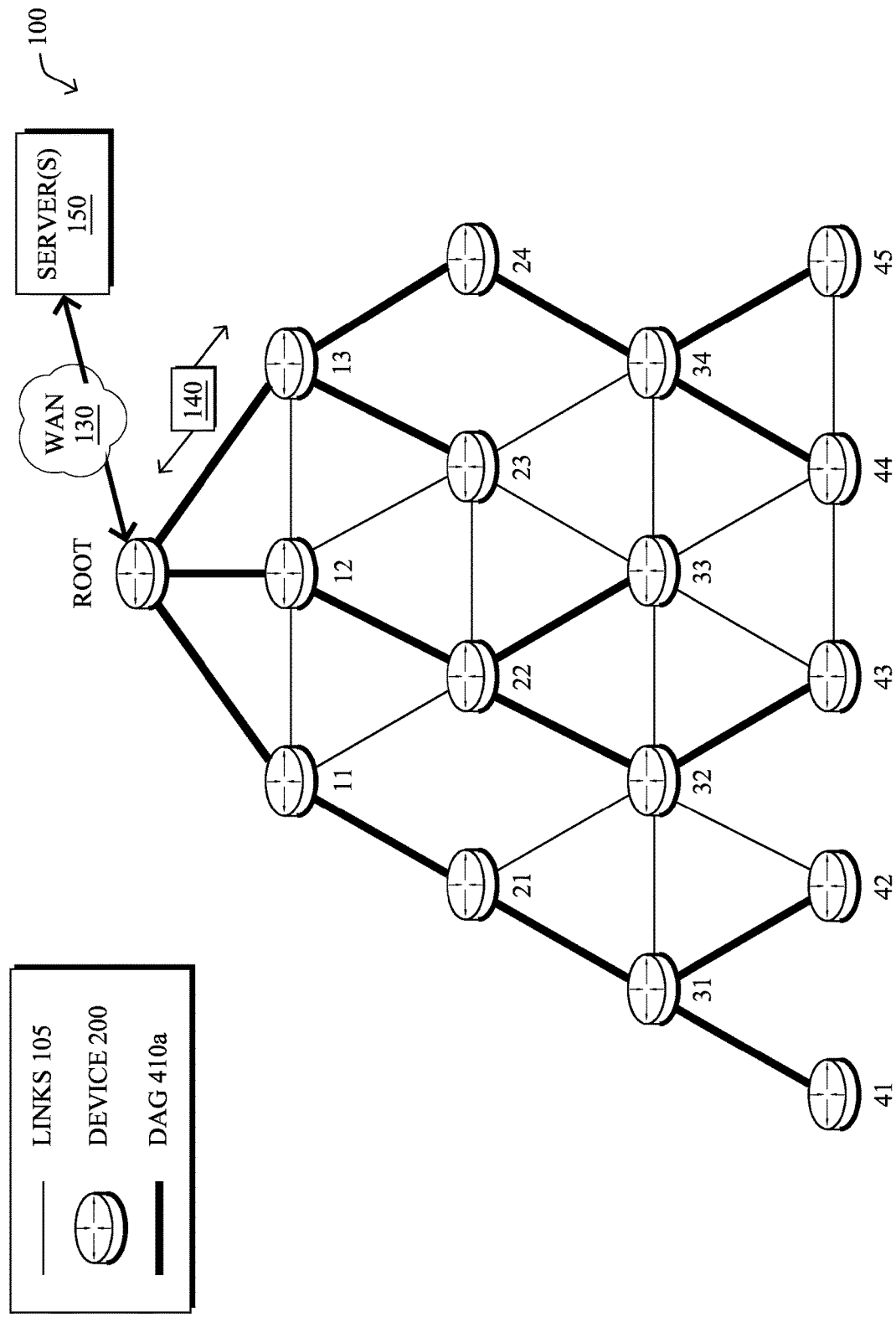
FIGS. 4A-4B illustrate an example of "flapping" in a communication network.
Figure 4B:
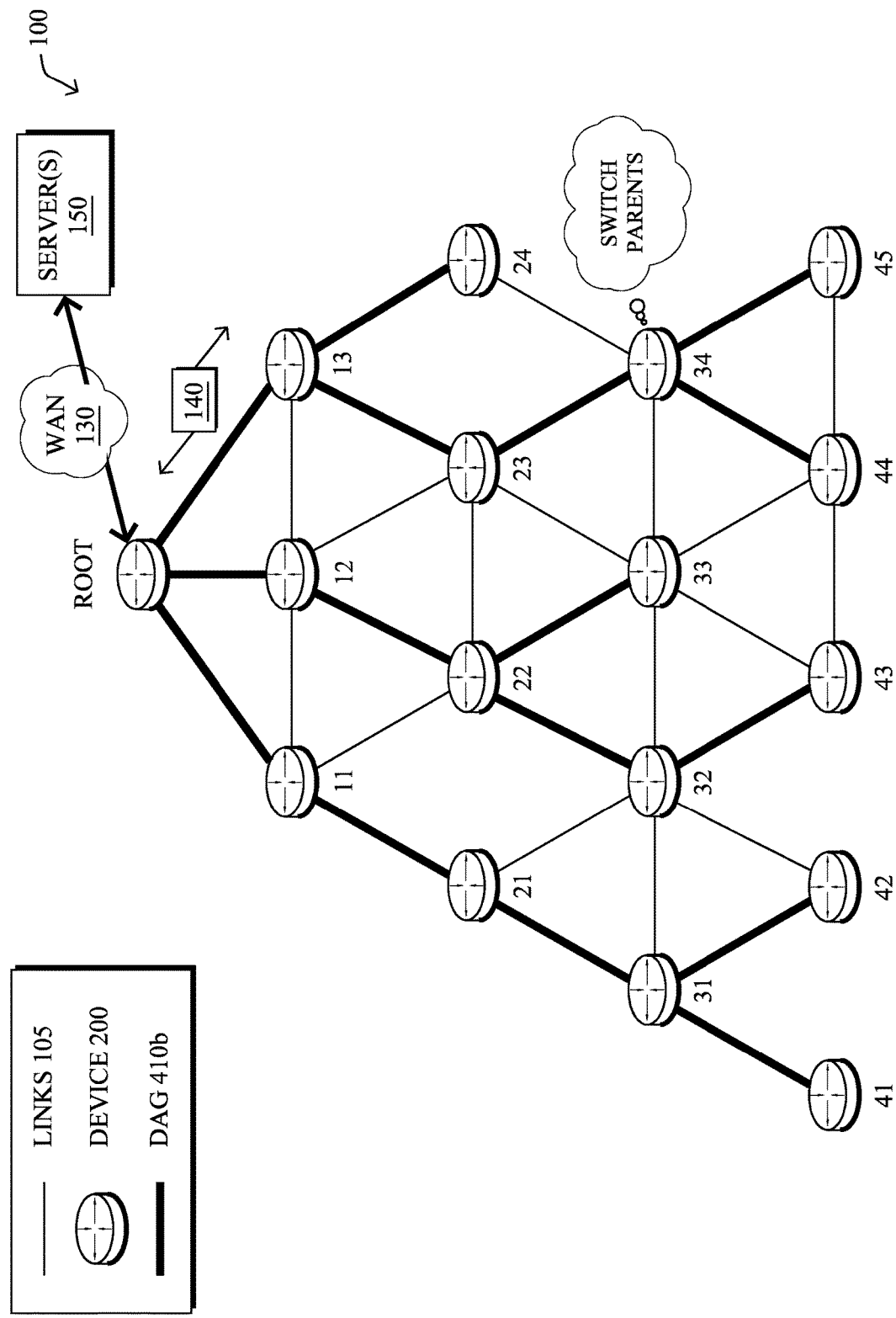

FIGS. 4A-4B illustrate an example of "flapping" in a communication network. As shown in FIG. 4A, DAG 410a may be formed in the network 100 of FIG. 1, e.g., using the techniques described above (e.g., RPL or similar routing protocol). For instance, certain links 105 may be selected for each node to communicate with a particular parent and, thus, in the reverse, to communicate with a child, if one exists. These selected links form the DAG 410a (shown as bolded lines), which extends from the Root node toward one or more leaf nodes (nodes without children). Traffic/packets 140 (shown in FIG. 1) may then traverse the DAG 410a in either the upward direction toward the root or downward toward the leaf nodes, particularly as described herein.

As noted above, changing network conditions in an LLN/mesh network may cause routing topology changes to occur. In addition, it is not uncommon for nodes in a mesh IoT network to misbehave because of a software defect or misconfiguration. As a result, any given node may oscillate between favoring parents with a slightly better path, thus leading to potential cascading effects along the routing topology. Since routing topology stability is often one of the most critical performance metrics in an IoT mesh, it is of the utmost importance to detect nodes whose misbehavior may lead to abnormal routing oscillations.

For example, as shown in FIG. 4B, node 34 may switch parents from node 24 to node 23 (e.g., along DAG 410b) for any of the reasons noted above. If, in turn, the path via node 24 is again determined to be along the optimal path from node 34 to the Root (e.g., the paths via nodes 23 and 24 exhibit very similar metrics, etc.), node 34 may switch back to using node 24 as its parent, as illustrated in FIG. 4A. Thus, in some instances, a node may oscillate between using two or more different routing parents. Such oscillations are also referred to herein as "flapping."

Oscillation anomalies are often difficult to detect and can impinge on the traffic associated with the node causing the routing oscillations. For example, if node 34 keeps flapping between nodes 23 and 24, this may have a negative impact on any traffic sent by node 34 in terms of latency, out-of-order packets, etc. Similarly, any traffic routed through node 34 by its children nodes 44 and 45 may also be affected.

Detecting Oscillation Anomalies in Mesh Networks Using Machine Learning

The techniques herein provide mechanisms that leverage machine learning to detect oscillation anomalies in a mesh network. In some aspects, a supervised machine learning algorithm (e.g., an ANN, etc.) may gather and use routing topology metrics to detect a misbehaving/anomalous node. In further aspects, when an anomaly is detected, notifications may be sent to the node and/or the neighbors of the node, to mitigate the anomaly (e.g., by pruning or adjusting the node in the routing topology, etc.).

Specifically, according to one or more embodiments of the disclosure as described in detail below, a device in a network receives metrics regarding a node in the network. The device uses the metrics as input to a machine learning model. The device determines, using the machine learning model and based on the metrics, an indication of abnormality of the node oscillating between using a plurality of different routing parents in the network. The device provides a results notification based on the indication of abnormality of the node oscillating between using the plurality of different routing parents.

Illustratively, the techniques described herein may be performed by hardware, software, and/or firmware, such as in accordance with the oscillation analysis process 248/248a, which may contain computer executable instructions executed by the processor 220 (or independent processor of interfaces 210) to perform functions relating to the techniques described herein, e.g., in conjunction with routing process. For example, the techniques herein may be treated as extensions to conventional protocols, such as the various PLC protocols or wireless communication protocols, and as such, may be processed by similar components understood in the art that execute those protocols, accordingly.

Operationally, a first aspect of the techniques herein is the aggregation of various inputs characterizing the overall routing topology dynamics with the objective of identifying misbehaving nodes that tend to make the topology unstable. To that end, in various embodiments, supervised machine learning may be used (e.g., ANNs, feed-forward neural networks, etc.) to identify any oscillation anomalies.

Figure 5A:
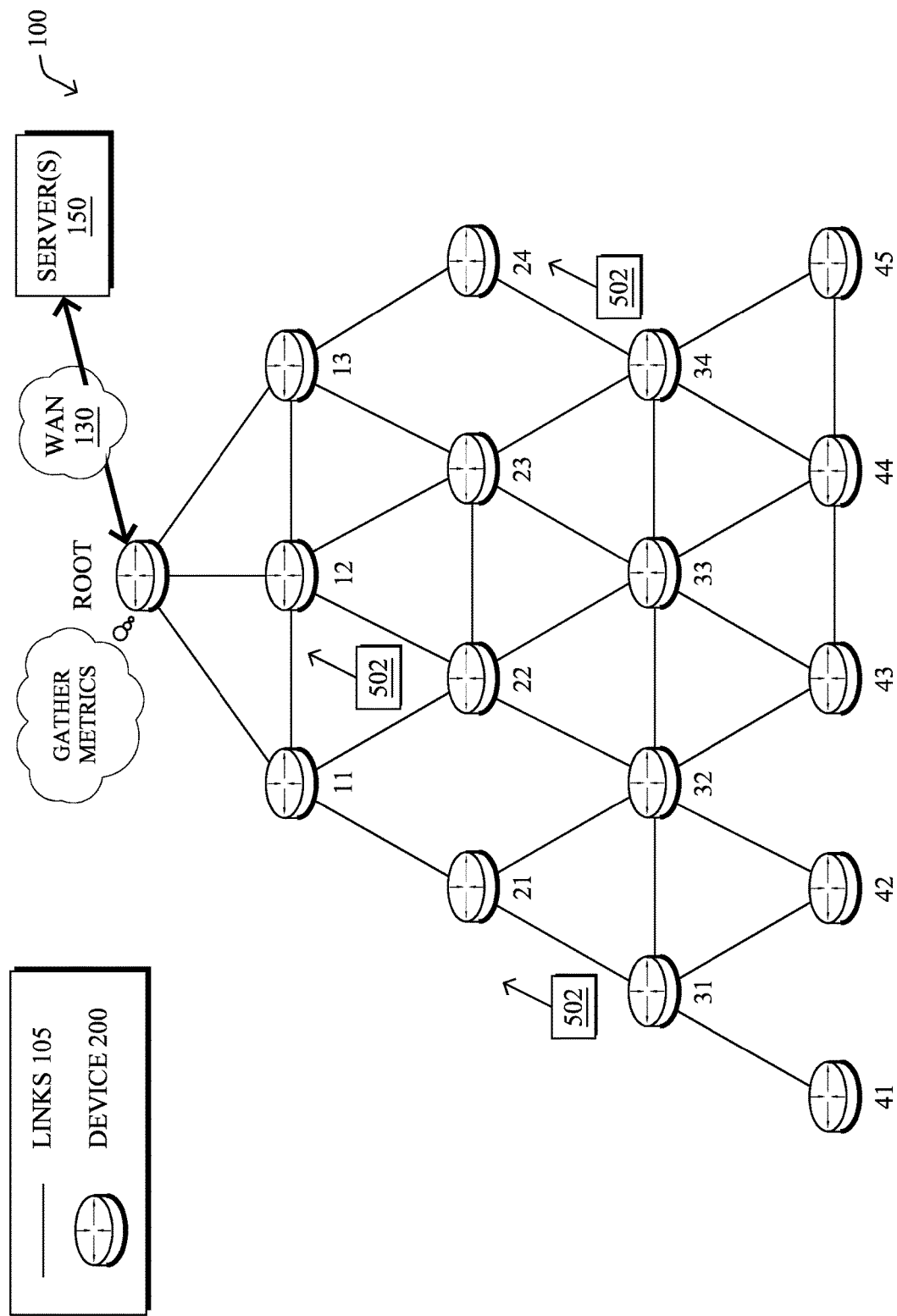
FIGS. 5A-5B illustrate an example device generating a machine learning model.

In some embodiments, various routing topology metrics of interest may be collected, to model the expected per-node routing topology stability. For example, as shown in FIG. 5A, any or all of the nodes 11-45 in network 100 may provide metrics 502 to a Machine Learning Engine (MLE). In some embodiments, the DAG Root may be configured as an MLE. In other embodiments, another device in network 100 may act as the MLE such as, e.g., one of servers 150 (e.g., an NMS, etc.).

The gathered metrics 502 may include any or all of the following information regarding a particular reporting node:
- A list of (preferred) parents of the node. In some embodiments, this information may be reported via DAO messages sent to the DAG root in non-storing mode.
- Link ETX metrics, which may be representative of the link quality between the reporting node and its neighboring nodes. In some embodiments, these met piggy-backed in DAO routing advertisements (note that the link ETX provides a good metric of the local link quality),
- Proportion of out-of-order packets associated with the node. Such a metric is usually not available on the DAG Root and may be challenging to compute. In some embodiments, the Root or another device may perform Deep Packet Inspection (DPI) on TCP flows, to determine the number of mis-ordered packets in the network due to routing changes, which can cause out-of-order packets to occur (e.g., packet A is sent before packet B, but arrives after packet B). In the case of UDP, DPI may be used at the application layer, to detect packet mis-orderings.
- Other categorical data regarding a node. For example, the MLE may gather information such as the node software version, name of supplier, etc. In further cases, this information may also indicate the Objective Function (OF) used to select the reporting node's parent(s).

According to various embodiments, the Root may gather metrics 502 on a pull basis (e.g., by requesting the metrics from a specific node or set of nodes), passively (e.g., by analyzing DAO routing messages, etc.), and/or by actively analyzing traffic flowing in network 100. If the Root is also configured as an MLE, the Root may then use the gathered metrics locally. Otherwise, the Root may provide metrics 502 to the MLE device for analysis.

Figure 5B:
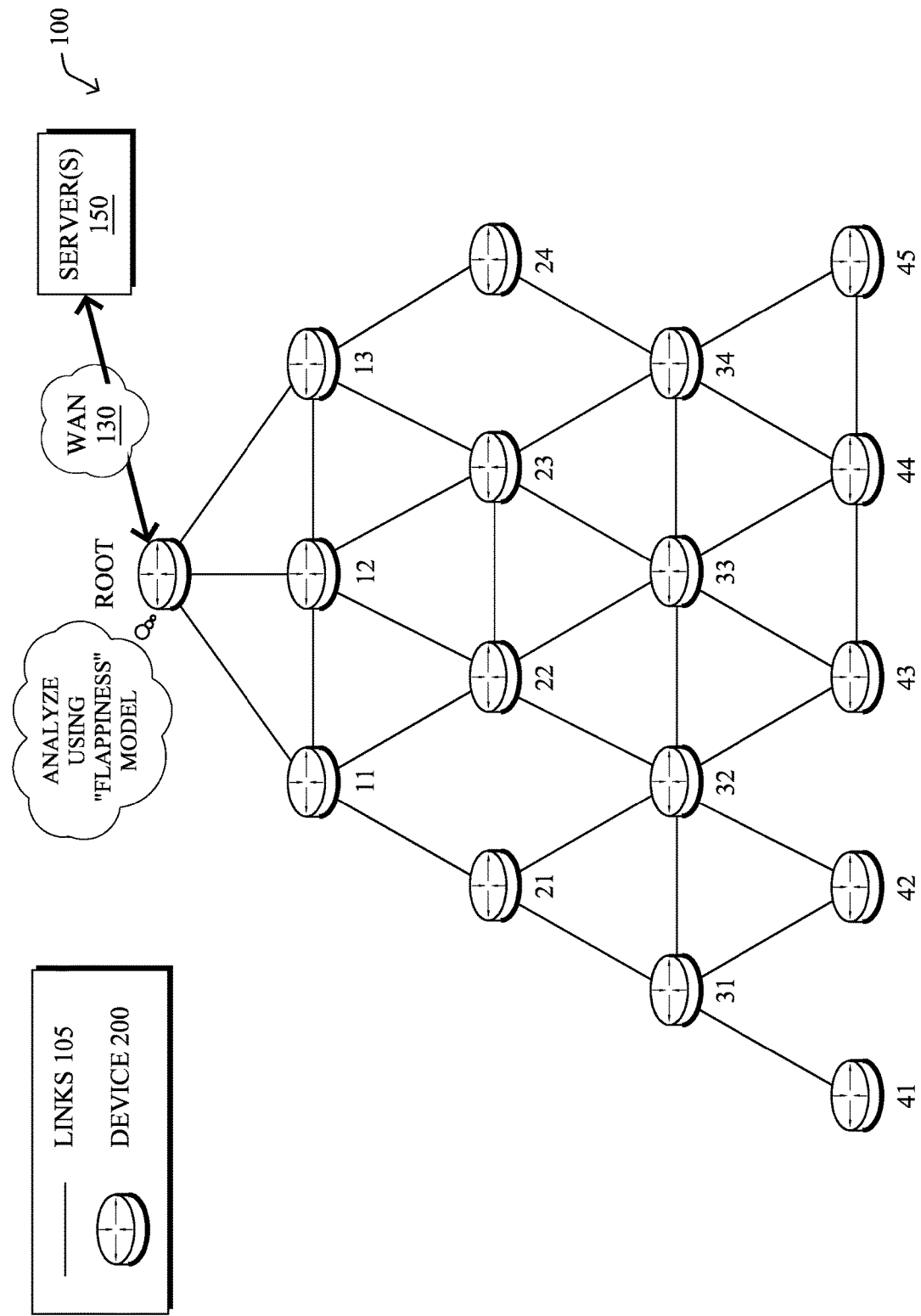

The MLE may use metrics 502 as input to one or more machine learning models/processes, to determine whether a node in network 100 is exhibiting anomalous oscillations or is expected to exhibit such behavior. For example, as shown in FIG. 5B, if the Root device is an MLE, it may analyze metrics 502 using one or more machine learning models configured to detect/analyze the flappiness of a node.

Figure 6A:
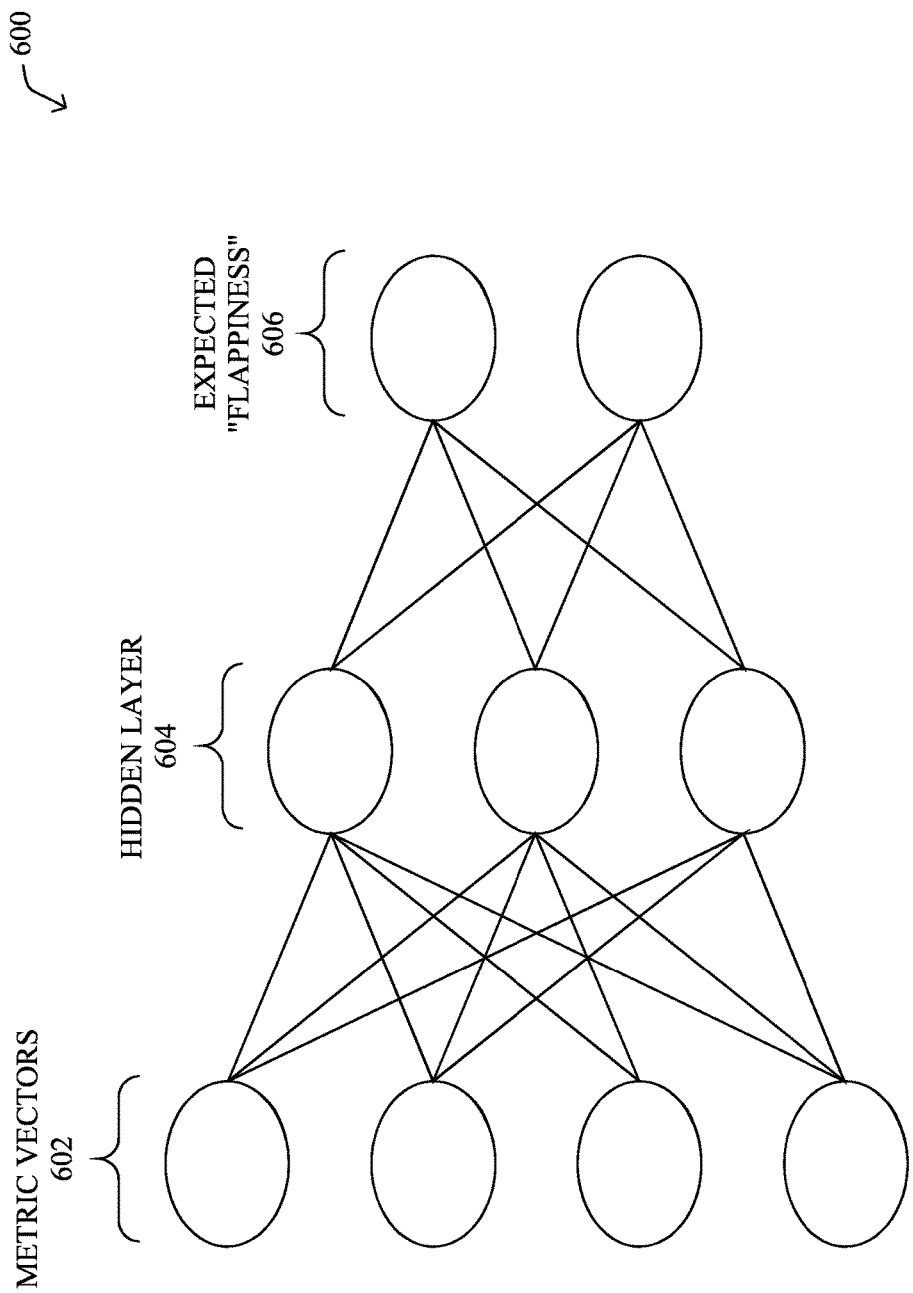
FIGS. 6A-6B illustrate example machine learning models.
Figure 6B:
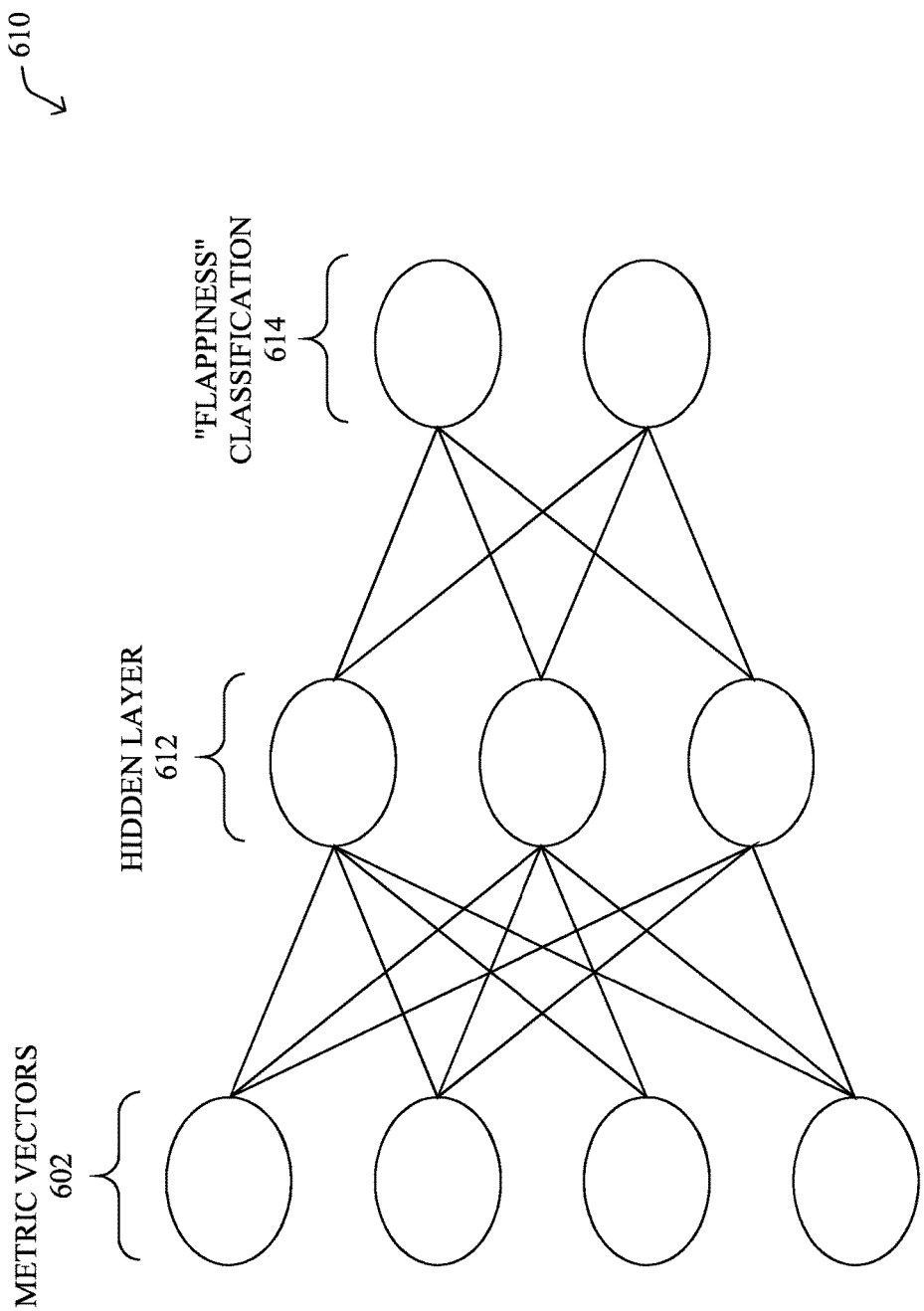

Referring now to FIGS. 6A-6B, example machine learning models are shown, according to various embodiments. In some embodiments, an MLE may use an ANN to detect routing stability anomalies based on off-line training. For example, as shown in FIG. 6A, ANN 600 may include a set of input neurons 602, one or more sets of neurons in a hidden layer 604, and any number of output neurons 606.

In various embodiments, input neurons 602 may comprise entries of metric vectors of high dimensionality. For example, such vectors may indicate the list of parents of a node, ETX values for the node's links, proportions of out-of-order packets originated by the node, the system configuration of the node (e.g., the node's software version, etc.), or the like.

In the embodiment shown in FIG. 6A, the output neurons 606 may represent expected ranges of flappiness for the node. For example, output neurons 606 may correspond to ranges of expected parent changes performed by the node during a set time period (e.g., parent changes per hour, day, etc.). In other words, ANN 600 may be trained to determine the expected flappiness of the node under analysis as a non-linear function of the input metric vector.

In further embodiments, an MLE may maintain an ANN configured to classify the behavior of the nodes as normal or abnormal. For example, as shown in FIG. 6B, ANN 610 may use metric vectors 602 as input neurons, in a manner similar to that of ANN 600. However, in contrast to ANN 600, output neurons 614 may instead be operable to indicate a classification of the node under analysis using hidden layer neurons 612. For example, ANN 610 may classify a node as normal or abnormal (two classes for each of the two output neurons) based on the input metric vectors 602 and on the flappiness of the node.

In some cases, the classification by ANN 610 may be based on a ground truth (e.g., a baseline set of data by which classifications may be made). For example, in one embodiment, a network administrator may provide a ground truth for ANN 610 by performing a manual classification of nodes as normal or abnormal (e.g., via a user interface). Such a supervised learning process may be rerun upon adding new nodes or when the network conditions have changed significantly. In other cases, ANN 610 may be trained in a less cumbersome manner. For example, ANN 610 may be configured to treat all inputs as normal, unless a user marks a node as behaving abnormally. In such a case, ANN 610 may be retrained using this manual classification.

Figure 7A:
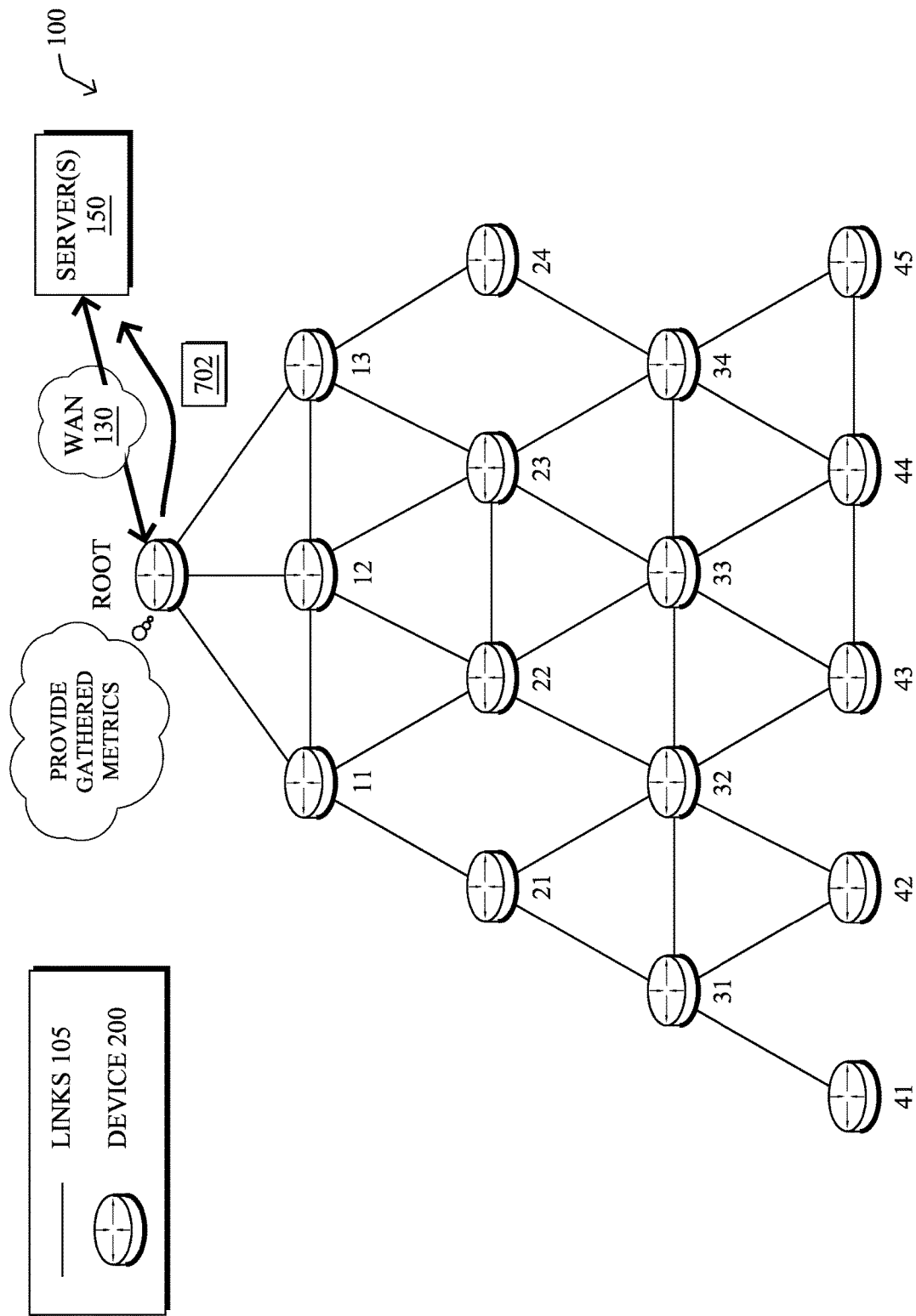
FIGS. 7A-7B illustrate an example of a machine learning model being trained.
Figure 7B:
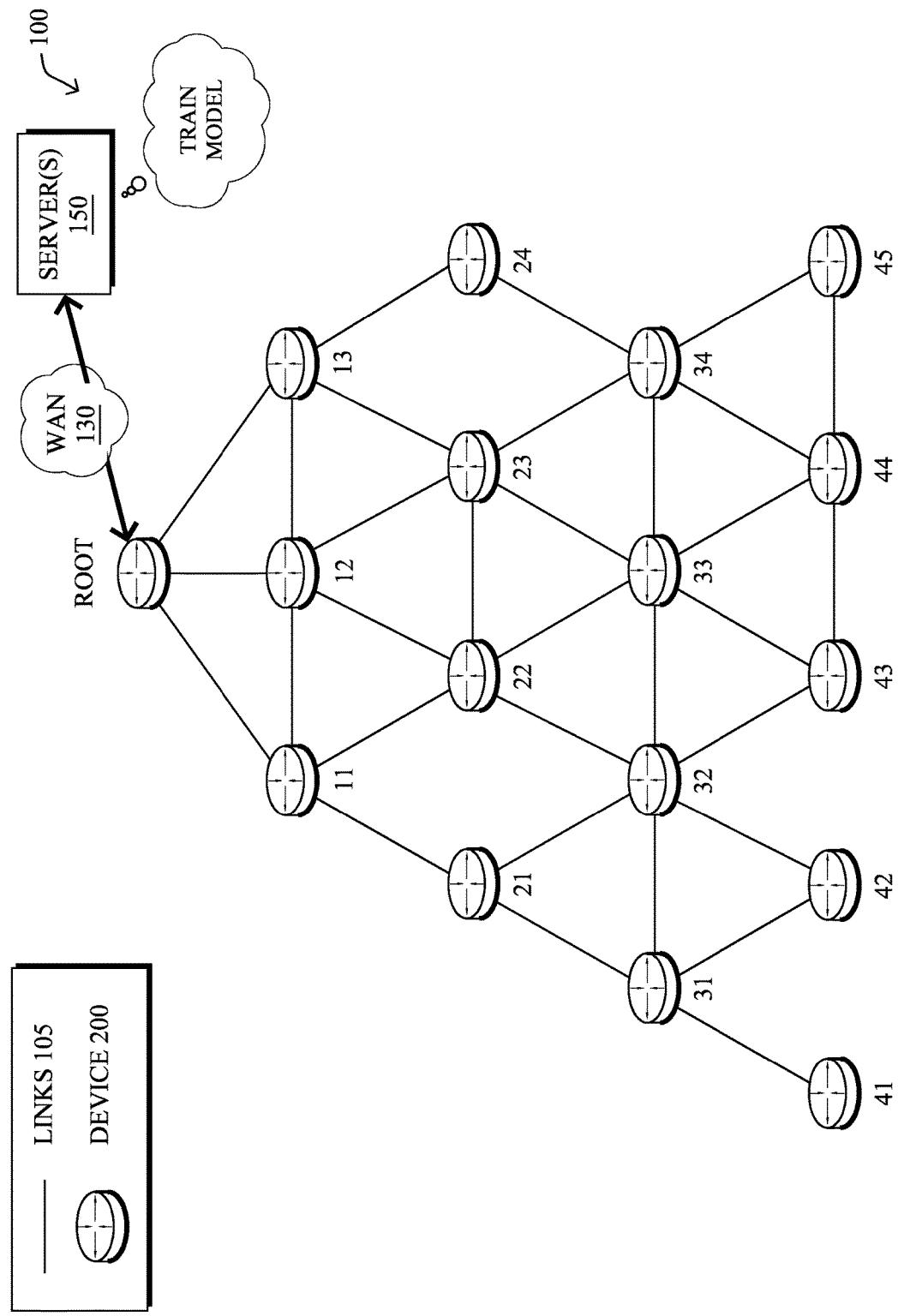

Referring now to FIGS. 7A-7B, an example of a machine learning model being trained is shown, according to various embodiments. In the implementation shown in FIG. 7A, assume that one of servers 150 (e.g., an NMS, etc.) is configured as the MLE. In some embodiments, the DAG Root may send the gathered network metrics to the MLE via a custom IPv6 message 702. In response, as shown in FIG. 7B, the MLE may train the model using the gathered metrics (e.g., leveraging input from a network administrator, etc.).

Once generated, the Root device may continue to send messages 702 to the MLE for analysis using the trained model, to detect oscillation anomalies in network 100. In some embodiments, message 702 may also be used to initiate retraining of the model at the MLE. For example, the MLE may retrain the model after receiving a fixed number of new samples. In other embodiments, retraining of the model may be initiated in response to receiving an instruction to do so from a user interface device (e.g., a network administrator requests retraining of the model). In further embodiments, the model may be trained at servers 150 and pushed down to a networking device in the local network, such as the Root device. As would be appreciated, training a non-linear model of the expected level of routing stability in the network (e.g., the degree of flappiness, etc.), while taking into account a variety of network measurements, may allow for the detection of anomalous oscillations.

Referring now to FIGS. 8A-8E, examples are shown of corrective measures being taken in response to detecting an abnormal oscillation in a network, according to various embodiments. In various cases, corrective measures may be taken by the misbehaving node itself, by any number of nodes along the same routing path as the misbehaving node, and/or at the supervisory level for the network.

In some embodiments, in response to determining that a particular node is misbehaving (e.g., the node is exhibiting abnormal oscillations), the MLE may inform the misbehaving node itself, to initiate local corrective measures at the misbehaving node.

Figure 8A:
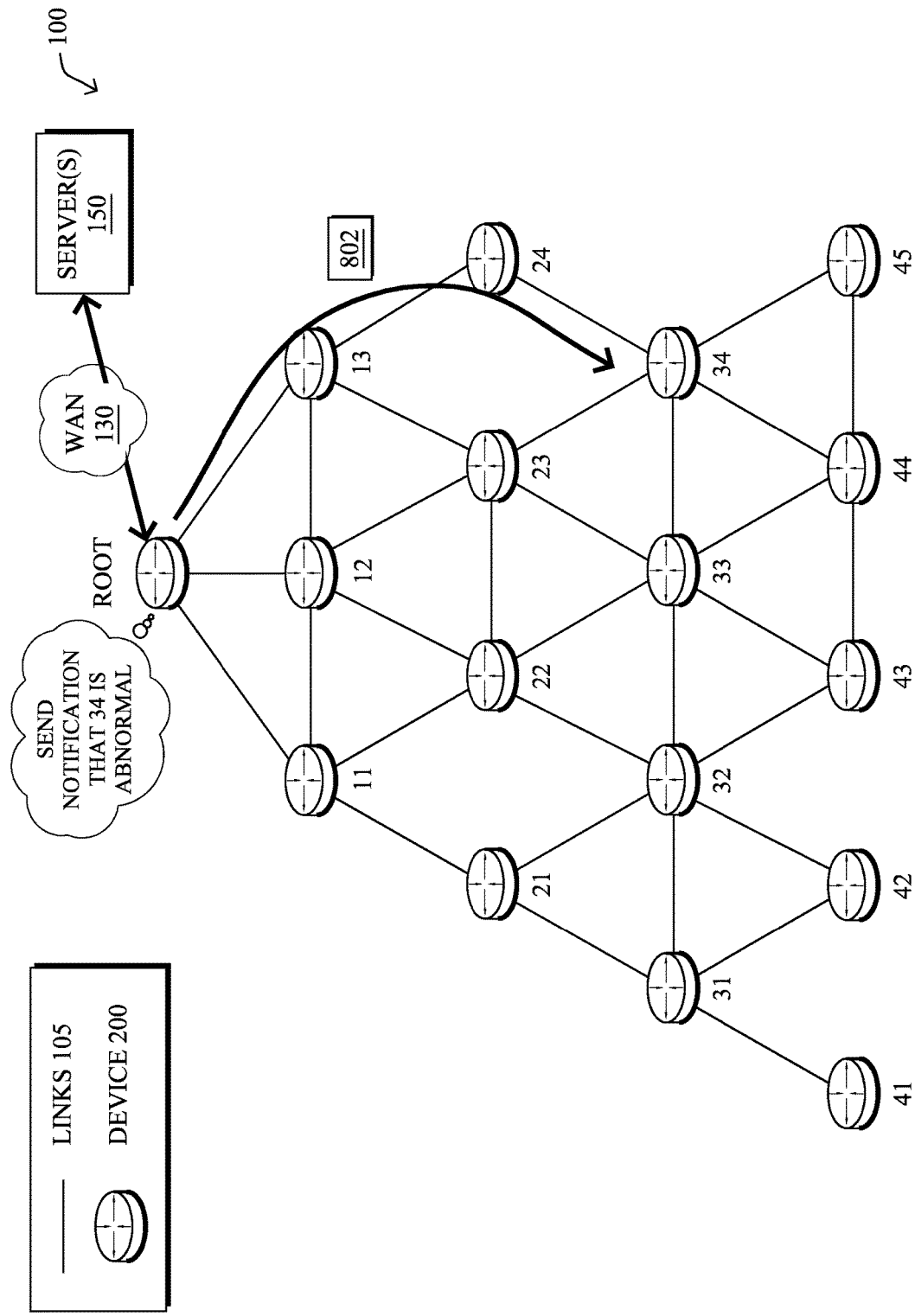
FIGS. 8A-8E illustrate corrective measures being taken in response to detecting an abnormal oscillation in a network.
Figure 8B:
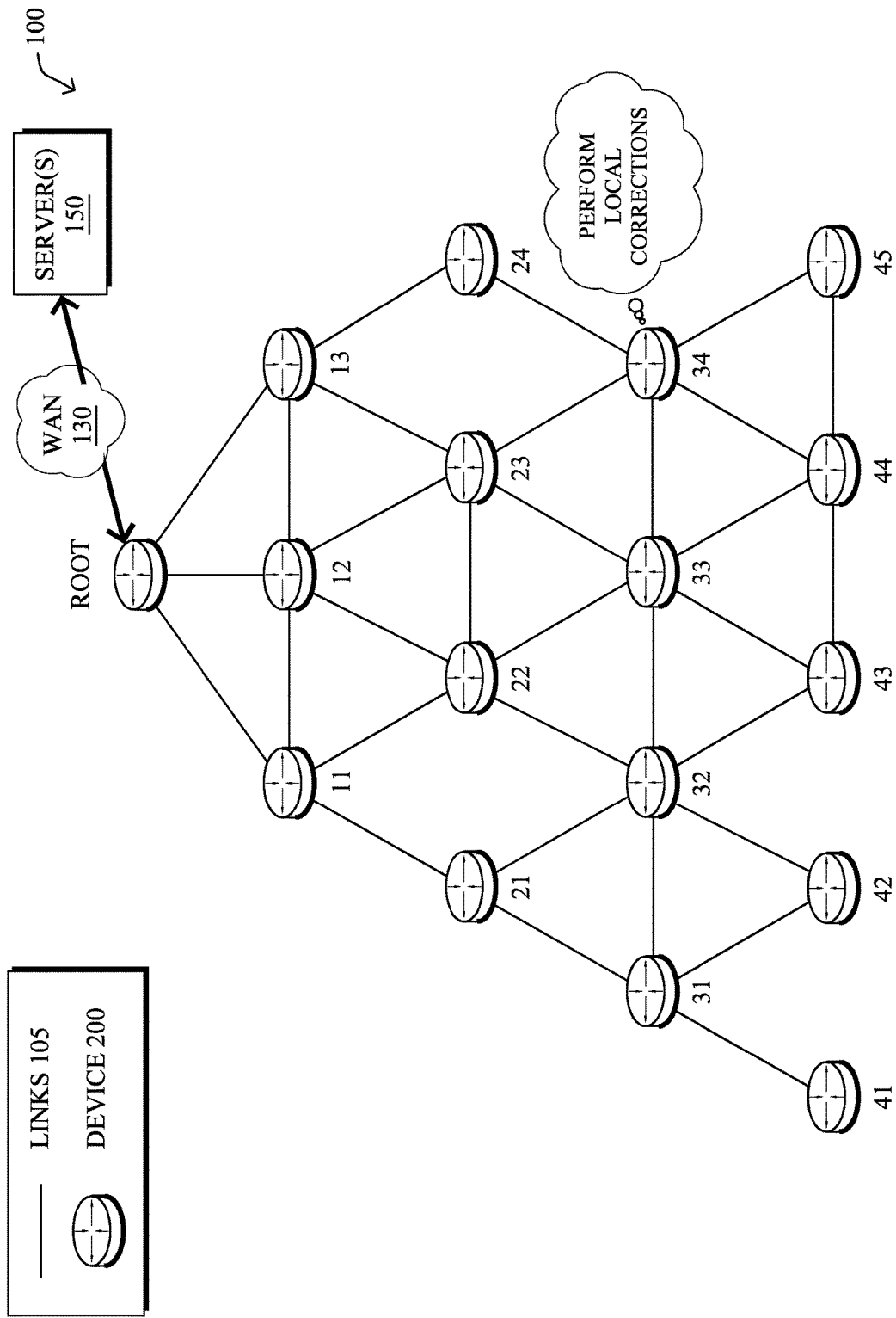

For example, as shown in FIG. 8A, if the Root device is configured as an MLE and determines that node 34 is experiencing abnormal flapping, the Root device may send a notification 802 to node 34 regarding its determination. In response to receiving notification 802, as shown in FIG. 8B, node 34 may take corrective measures such as rebooting immediately or scheduling a reboot at a later time (e.g., as indicated in notification 802, etc.). In another embodiment, node 34 may use a different objective function, in response to receiving notification 802. Based on the new objective function, node 34 may favor one of its potential routing parents over another, thereby alleviating the oscillation condition.

In another embodiment, the MLE may send a notification to an NMS or other supervisory device. For example, the MLE may notify a network administrator regarding the misbehaving node. In turn, the administrator may specify the corrective measures to be taken with respect to the node.

Figure 8C:
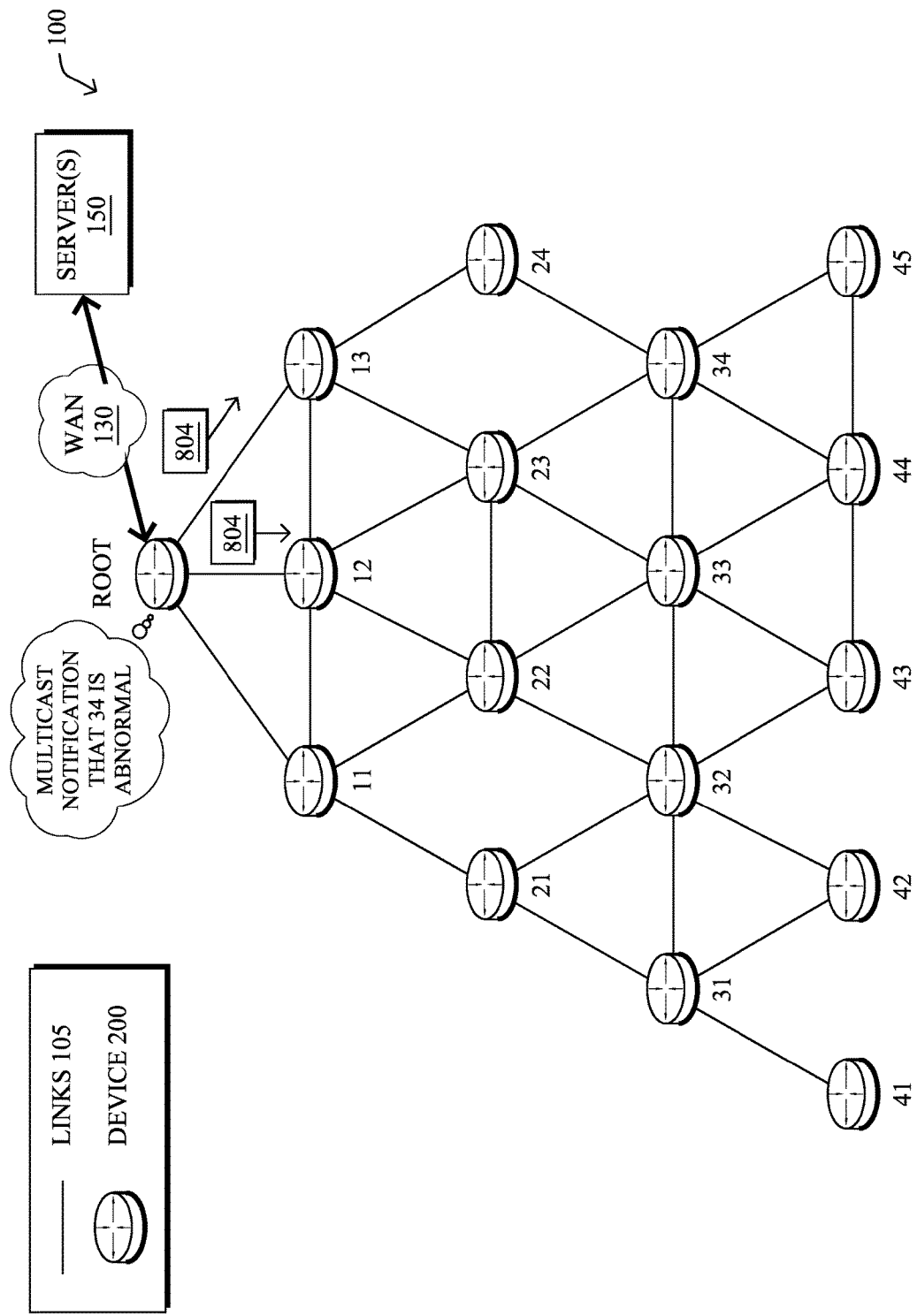
Figure 8D:
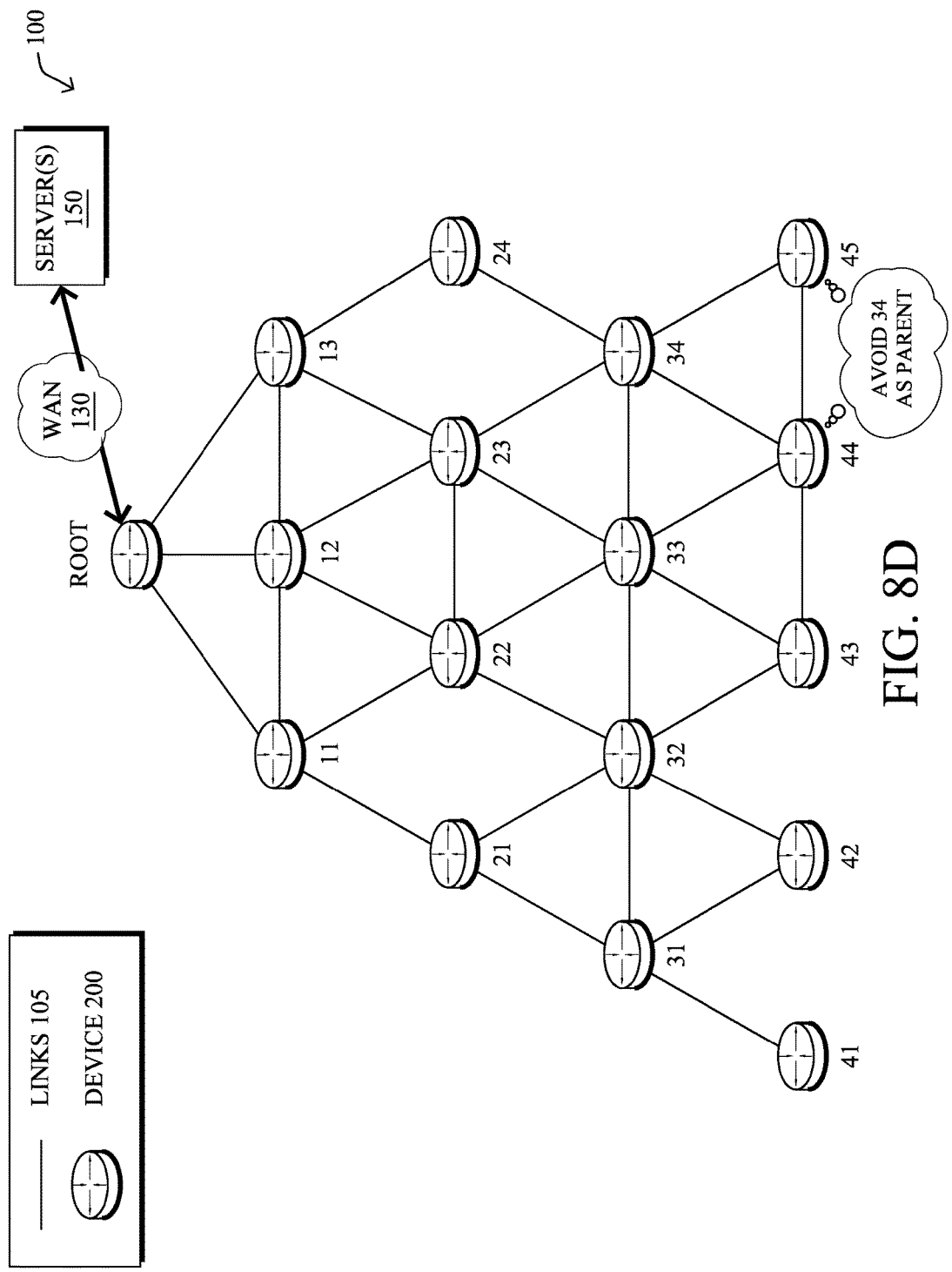
Figure 8E:
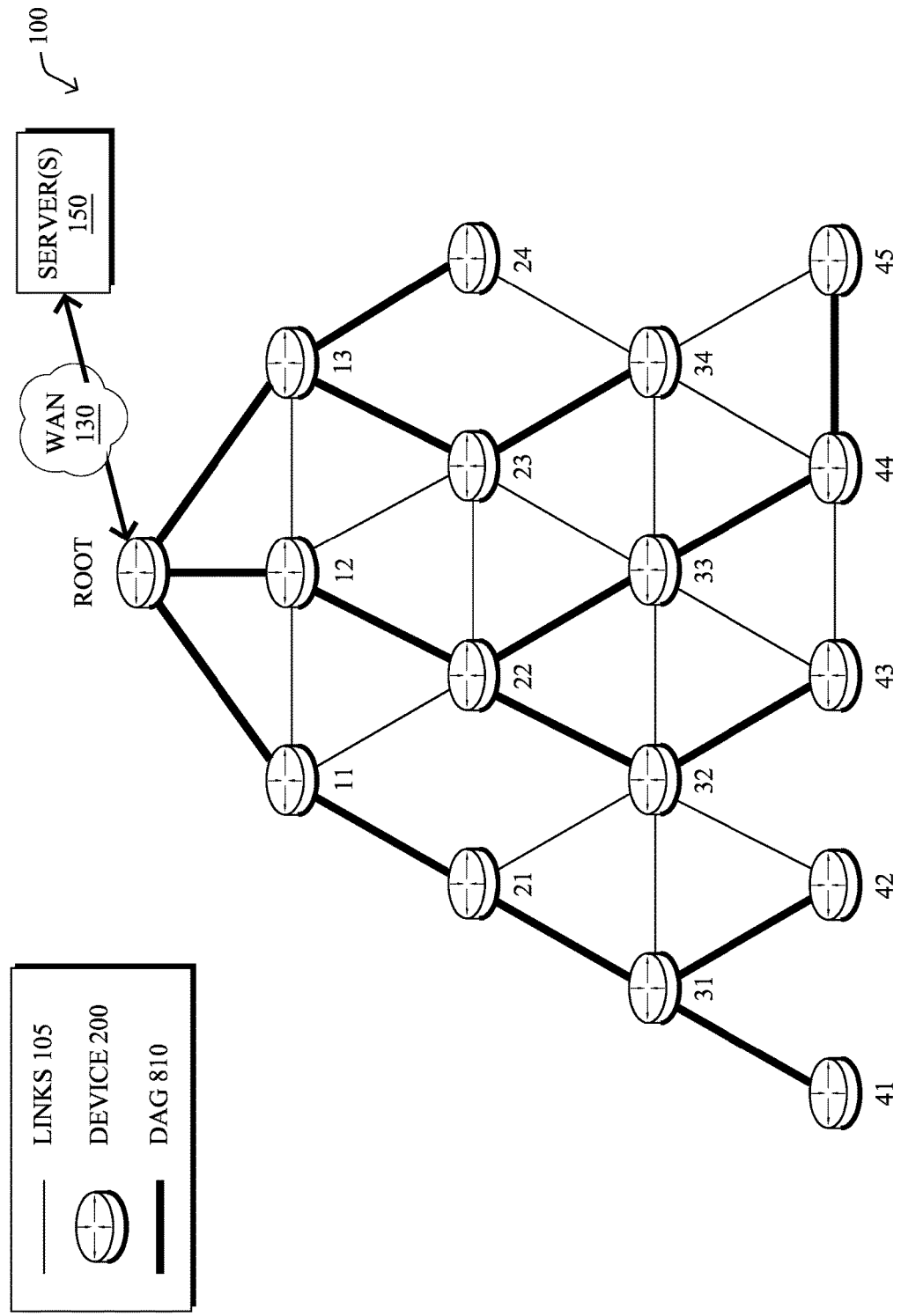

In further embodiments, the MLE may send a custom IPv6 multicast message to any or all of the nodes in the network indicating that a particular node is misbehaving. For example, as shown in FIG. 8C, the MLE/Root may send a multicast notification 804 that node 34 is exhibiting excessive route oscillations. In response to receiving notification 804, a receiving node may act to prune node 34 from its routes. For example, as shown in FIG. 8D, nodes 44-45 may prune node 34 from their respective lists of potential parents. In turn, as shown in FIG. 8E, nodes 44-45 may avoid routing traffic through node 34 (e.g., according to DAG 810 shown).

Figure 9:
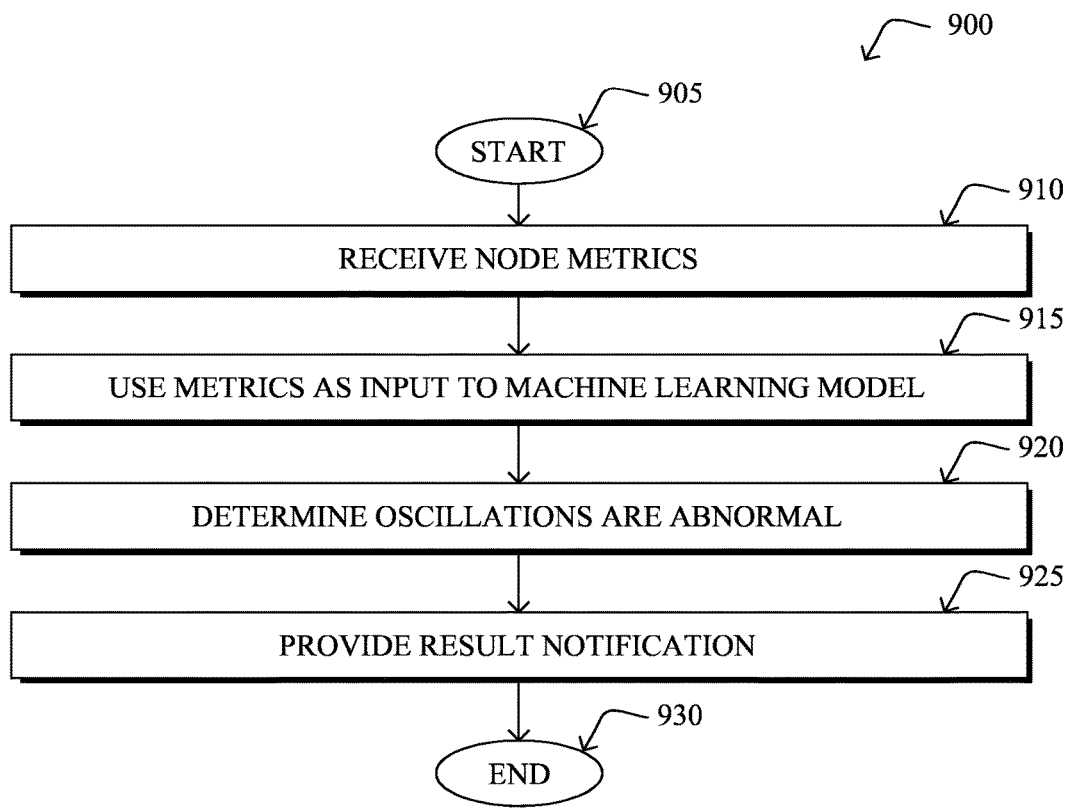
FIG. 9 illustrates an example simplified procedure for detecting oscillation anomalies in a mesh network.

Referring now to FIG. 9, an example simplified procedure for detecting oscillation anomalies in a mesh network is shown, according to various embodiments. Procedure 900 may be performed by a device (e.g., device 200) by executing stored instructions. Procedure 900 may begin at step 905 and continue on to step 910 where, as described in greater detail above, a device in a network receives metrics regarding one or more nodes in the network. Generally, the received metrics may be any form of metrics that may be indicative of the node exhibiting abnormal flapping. For example, the received metrics may include, but are not limited to, ETX values, sets of preferred routing parents, metrics regarding mis-ordered packets from the node (e.g., by performing DPI on packets associated with the node), configuration information regarding the node, combinations thereof, or the like.

At step 915, as detailed above, the device may use the metrics as inputs to a machine learning model. In various embodiments, the machine learning model may be operable to analyze the amount of link oscillations (e.g., flapping) exhibited by the node. For example, in some embodiments, the model may be operable to determine an expected degree of flappiness for the node (e.g., the number of parent switches that the node performs within a given amount of time, etc.). In other embodiments, the machine learning model may be operable to classify the behavior of the node, such as normal vs. abnormal. In some embodiments, the machine learning model may use supervised learning techniques. For example, the model may be trained using a ground truth specified by a network administrator (e.g., the administrator may manually flag a node as exhibiting abnormal oscillations). In further embodiments, the machine learning model may be a non-linear model, such as an ANN that uses a vector of the node metrics as input.

At step 920, the device may determine an indication of abnormality of the node oscillating between using a plurality of different routing parents in the network, as described in greater detail above. In particular, the device may determine a range of expected flappiness for the node and, in turn, determine whether the node is exhibiting abnormal flappiness. In another embodiment, the device may classify the node directly as abnormal or normal using the machine learning model.

At step 925, as detailed above, the device may provide a result notification based on the indication of abnormality. In some embodiments, the device may notify the abnormally behaving node directly. In turn, the node may take corrective measures such as rebooting, changing its routing objective function, or the like. In further embodiments, the device may send a multicast message to neighbors of the misbehaving node. In response, the nodes may take corrective measures such as altering their routing strategies to avoid the misbehaving node. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of subtle, yet harmful, oscillations in a mesh/IoT network. In some aspects, a machine learning mechanism (e.g., an ANN, which is very good at interpolating highly non-linear functions, etc.) may be used to detect whether the flappiness of a node is compatible with its network conditions. In other words, the behavior of the node may be assessed to detect abnormal routing oscillations by the node that cannot be explained by the particular conditions of the node (e.g., the physical location of the node, interference experienced by the node, etc.), but may instead be due to a bug or misconfiguration of the node.

While there have been shown and described illustrative embodiments that provide for the detection of abnormal oscillations in a network, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    training a machine learning model using a training set of data that comprises metrics regarding a plurality of nodes in a network and identifies which nodes of the plurality of nodes demonstrate abnormal link oscillations;
    receiving, at a device in the network, metrics regarding a particular node in the network;
    using, by the device, the metrics as input to the trained machine learning model;
    determining, using the trained machine learning model and based on the metrics, an indication of abnormality of the particular node oscillating between using a plurality of different routing parents in the network;
    providing, by the device, a results notification identifying the particular node as demonstrating abnormal link oscillations based on the indication of abnormality of the particular node oscillating between using the plurality of different routing parents; and
    based on the results notification, mitigating, by the device, abnormal link oscillations.

2. The method as in claim 1, wherein the indication of abnormality corresponds to an expected degree of oscillations for the particular node.

3. The method as in claim 1, wherein the indication of abnormality comprises a classification of the particular node as behaving abnormally by the trained machine learning model.

4. The method as in claim 1, wherein the received metrics comprise at least one of: an indication of preferred routing parents of the particular node, one or more link quality metrics associated with the particular node, an indication of an objective function used by the node to select a routing parent.

5. The method as in claim 1, further comprising:
    performing deep packet inspection on traffic from the node to identify packet reordering, wherein the metrics regarding the node comprise an indication of identified packet reordering.

6. The method as in claim 1, wherein the trained machine learning model comprises an artificial neural network (ANN).

7. The method as in claim 1, wherein providing the results notification comprises:
    providing the results notification to the node, wherein the particular node is configured to perform a corrective measure in response to receiving the result notification, wherein the corrective measure comprises selecting a different objective function or rebooting.

8. The method as in claim 1, wherein providing the results notification comprises:
    providing the results notification to one or more children of the particular node, wherein the one or more children are configured to select a different parent in response to receiving the results notification.

9. An apparatus, comprising:
    one or more network interfaces to communicate with a network;
    a processor coupled to the network interfaces and adapted to execute one or more processes; and
    a memory configured to store a process executable by the processor, the process when executed configured to:
        train a machine learning model using a training set of data that comprises metrics regarding a plurality of nodes in a network and identifies which nodes of the plurality of nodes demonstrate abnormal link oscillations;
        receive metrics regarding a particular node in the network;
        use the metrics as input to the machine learning model;
        determine, using the trained machine learning model and based on the metrics, an indication of abnormality of the particular node oscillating between using a plurality of different routing parents in the network;
        provide a results notification identifying the particular node as demonstrating abnormal link oscillations based on the indication of abnormality of the particular node oscillating between using the plurality of different routing parents; and
        based on the results notification, mitigate abnormal link oscillations.

10. The apparatus as in claim 9, wherein the indication of abnormality corresponds to an expected degree of oscillations for the particular node.

11. The apparatus as in claim 9, wherein the indication of abnormality comprises a classification of the particular node as behaving abnormally by the trained machine learning model.

12. The apparatus as in claim 9, wherein the received metrics comprise at least one of: an indication of preferred routing parents of the particular node, one or more link quality metrics associated with the particular node, an indication of an objective function used by the particular node to select a routing parent.

13. The apparatus as in claim 9, wherein the process when executed is further configured to:
    perform deep packet inspection on traffic from the particular node to identify packet reordering, wherein the metrics regarding the particular node comprise an indication of identified packet reordering.

14. The apparatus as in claim 9, wherein the trained machine learning model comprises an artificial neural network (ANN).

15. The apparatus as in claim 9, wherein the apparatus is configured to provide the results notification by providing the results notification to the particular node, wherein the particular node is configured to perform a corrective measure in response to receiving the result notification, wherein the corrective measure comprises selecting a different objective function or rebooting.

16. The apparatus as in claim 9, wherein the apparatus is configured to provide the results notification by providing the results notification to one or more children of the particular node, wherein the one or more children are configured to select a different parent in response to receiving the results notification.

17. A tangible, non-transitory, computer-readable media having software encoded thereon, the software when executed by a processor configured to:
   train a machine learning model using a training set of data that comprises metrics regarding a plurality of nodes in a network and identifies which nodes of the plurality of nodes demonstrate abnormal link oscillations;
   receive metrics regarding a particular node in the network;
   use the metrics as input to the trained machine learning model;
   determine, using the trained machine learning model and based on the metrics, an indication of abnormality of the particular node oscillating between using a plurality of different routing parents in the network;
   provide a results notification identifying the particular node as demonstrating abnormal link oscillations based on the indication of abnormality of the node oscillating between using the plurality of different routing parents; and
   based on the results notification, mitigate abnormal link oscillations.

18. The computer-readable media as in claim 17, wherein the trained machine learning model comprises an artificial neural network (ANN).

* * * * *

UNITED STATES PATENT AND TRADEMARK OFFICE
CERTIFICATE OF CORRECTION

PATENT NO. : 10,148,537 B2  
APPLICATION NO. : 14/855492  
DATED : December 4, 2018  
INVENTOR(S) : Jean-Philippe Vasseur et al.

Page 1 of 1

It is certified that error appears in the above-identified patent and that said Letters Patent is hereby corrected as shown below:

In the Specification

In Column 9, Line 11, please amend as shown:
select a DODAG parent set, and maintain the upward Signed and Sealed this
Twenty-second Day of September, 2020

Andrei Iancu
*Director of the United States Patent and Trademark Office*